Oct. 18, 1927. 1,645,711
J. W. MEADOWCROFT
JIG FOR ELECTRIC WELDING SHEET METAL PANELS
Filed April 2, 1926 2 Sheets-Sheet 1
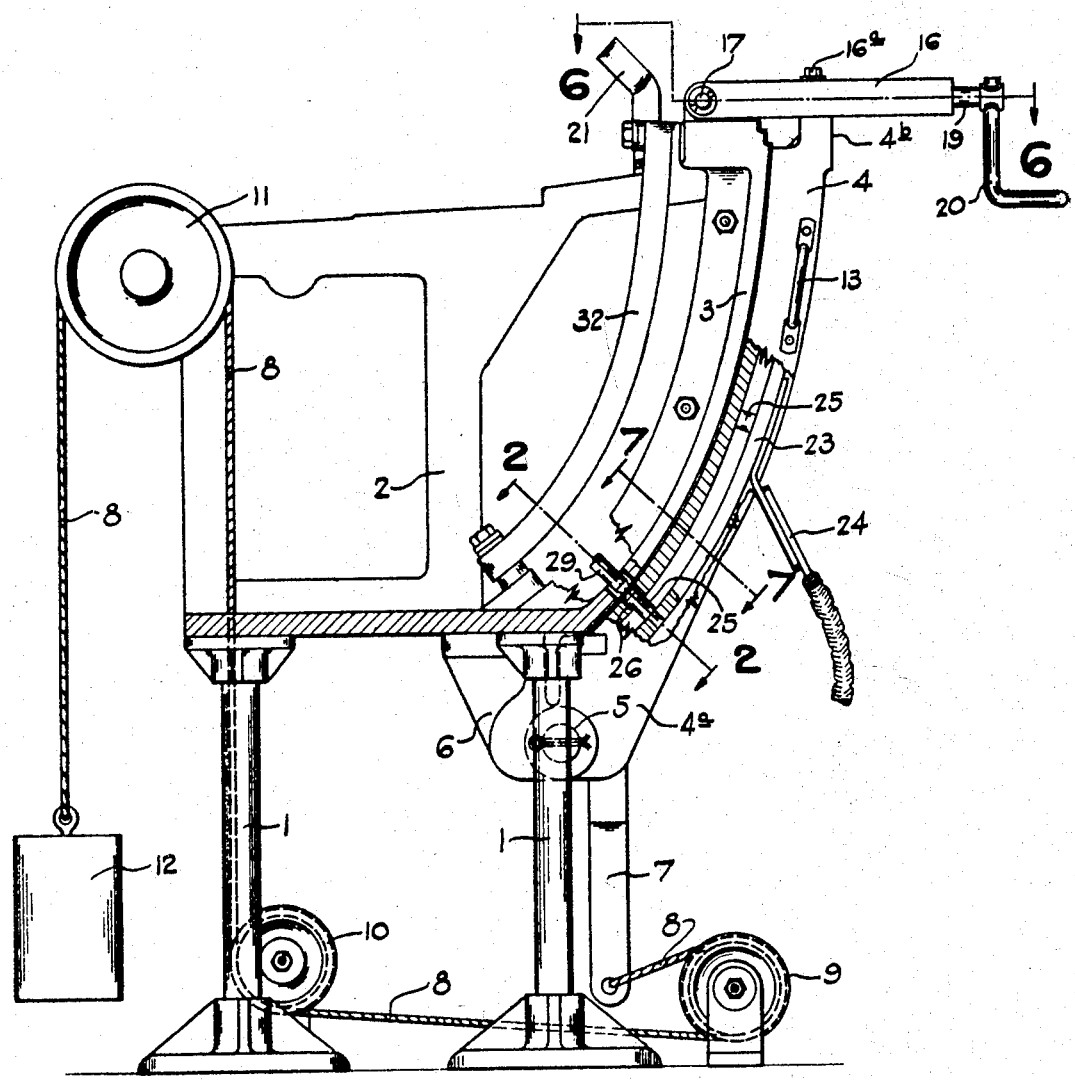
FIG. 1
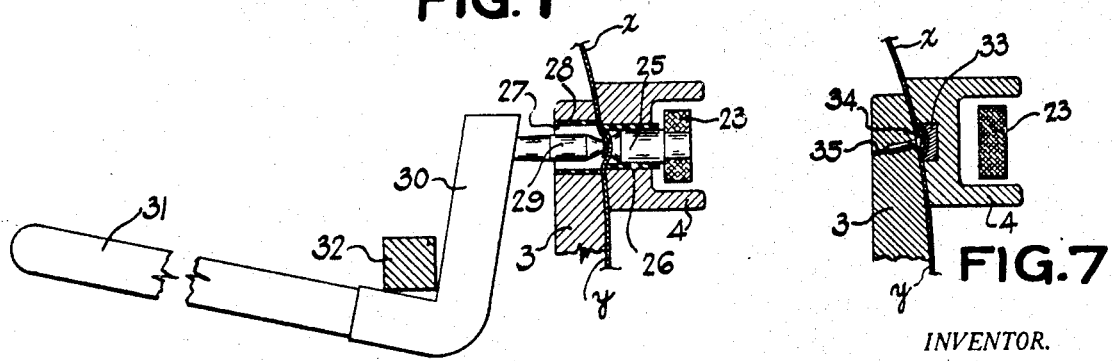
FIG. 2
FIG. 7
*INVENTOR.*
JOSEPH W. MEADOWCROFT
BY John P. Tarbox
*ATTORNEY.*

Oct. 18, 1927.    J. W. MEADOWCROFT    1,645,711
JIG FOR ELECTRIC WELDING SHEET METAL PANELS
Filed April 2, 1926    2 Sheets-Sheet 2
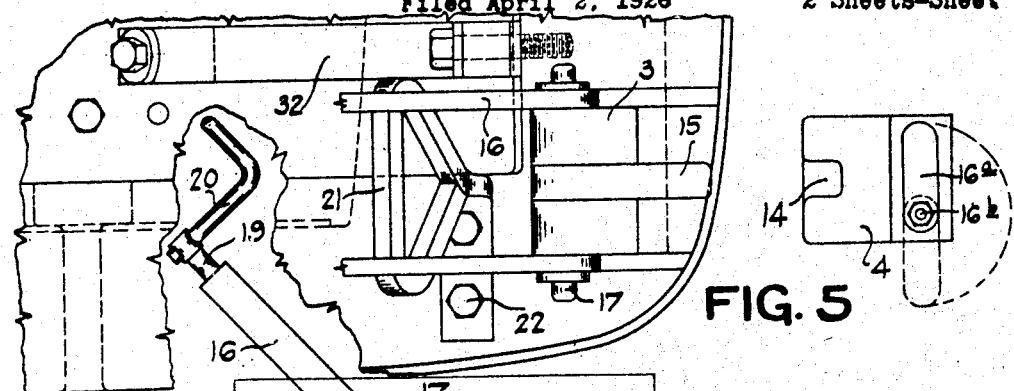
FIG. 5
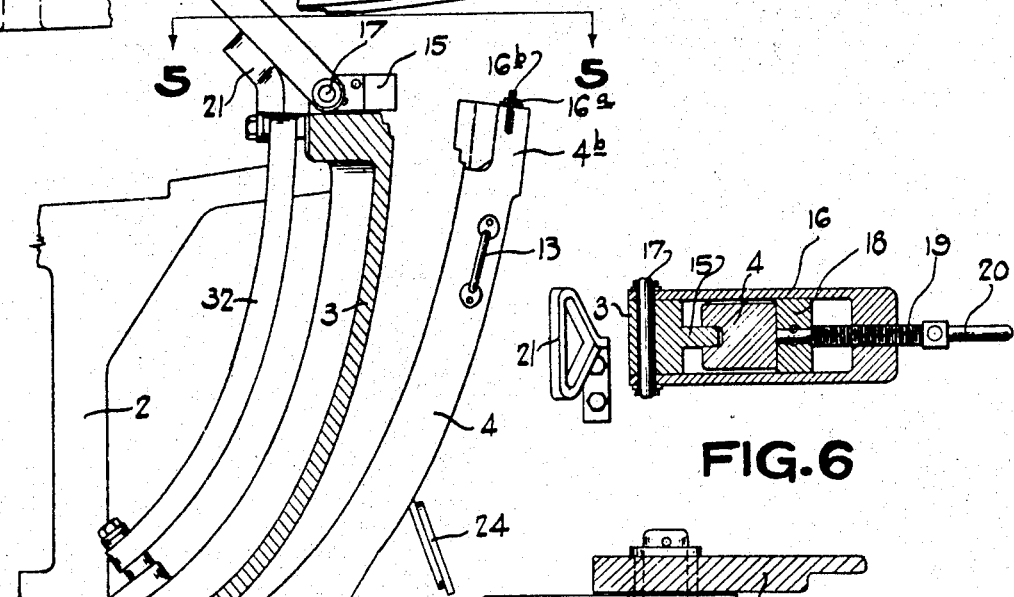
FIG. 6
FIG. 4
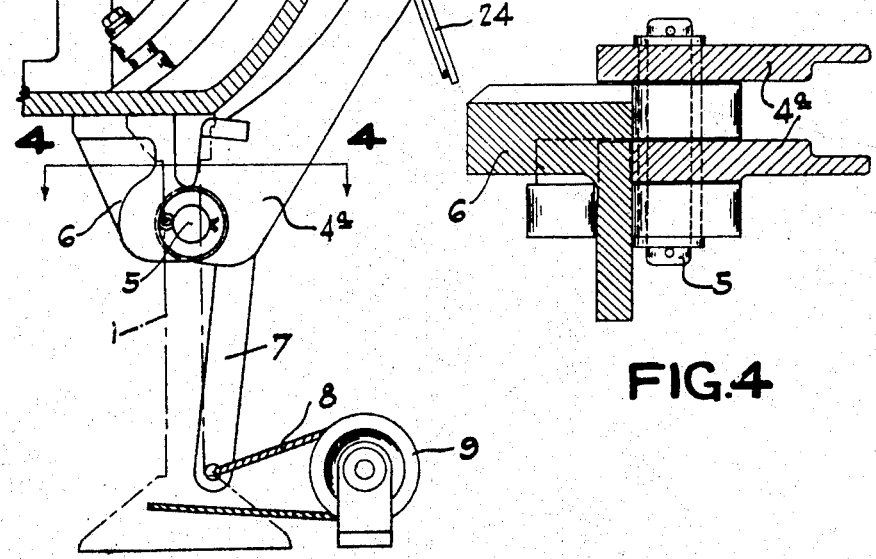
FIG. 3
INVENTOR.
JOSEPH W. MEADOWCROFT
BY
ATTORNEY.

Patented Oct. 18, 1927.

1,645,711

UNITED STATES PATENT OFFICE.

JOSEPH W. MEADOWCROFT, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

JIG FOR ELECTRIC WELDING SHEET-METAL PANELS.

Application filed April 2, 1926. Serial No. 99,189.

This invention relates to electric welding apparatus and more particularly to apparatus for spot welding metal sheets.

One of the objects of the invention is to provide a simple and effective clamping device in which the edges of the two sheets may be securely held while being welded. Another object is to provide a clamping device of the above character having die elements by means of which the metal sheets, which have been shaped to the desired form, are held in nested relationship and then welded while so held between the dies. A still further object of the invention is to provide improved means for producing a series of spot welds one at a time, at separated points along the sheets. Other objects and advantages will appear from the following description.

In order that the invention may be readily understood, reference is had to the accompanying drawings in which:

Figure 1 is a side elevation of my improved welding apparatus, parts being shown in section and parts being broken away;

Figure 2 is a section on the line 2—2 of Figure 1, looking in the direction of the arrow, parts being in elevation.

Figure 3 is a sectional elevation somewhat similar to Figure 1, but showing the parts in a different position;

Figure 4 is a section on the line 4—4 of Figure 3, looking in the direction of the arrow;

Figure 5 is a plan view of my improved clamping members on an enlarged scale, parts being broken away, substantially on the line 5—5 of Figure 3;

Figure 6 is a sectional view substantially on the line 6—6 of Figure 1, and

Figure 7 is a fragmentary transverse section substantially on the line 7—7 of Figure 1.

Referring to the drawings in detail, my improved machine is supported on suitable pedestals 1 and comprises a frame 2 having at one side a fixed clamp or forming member 3. This forming member is provided with an outer or working face having a contour conforming with the shape of the work being operated upon. In the embodiment shown the device is designed for use in welding the rear panels of automobile bodies to the side panels thereof, and the working face of the member 3 is therefore curved, following the lines of an automobile body.

Cooperating with the fixed member 3 and having a complementary working face, is a movable member 4 pivoted at its lower end to a suitable support 6 as indicated at 5, the lower end of the member 4 being bifurcated as indicated at 4ª this being best shown in Figure 4. The fact that the members 3 and 4 are arranged substantially vertically makes it possible to insert the sheets to be operated upon downwardly from the top between the members. This facilitates handling the sheets.

Projecting downwardly from the lower end of the movable member 4 is an arm 7 to the lower end of which is secured a cable 8. This cable passes over pulleys 9, 10 and 11, as clearly shown in Figure 1, and carries at its free end a suitable weight 12. From an inspection of the drawing it will be seen that this weight serves to normally urge the movable member toward and against the fixed member, as shown in Figure 1. In order to swing the member 4 on its pivot away from the member 3 as shown in Figure 3, I provide a handle 13 or the like by means of which the member 4 may be moved.

As shown in Figures 2 and 7, the member 4 is substantially channel-shaped in cross-section for the major portion of its length, but its outer face at the upper end is made flat and solid as indicated at 4ᵇ. On the inside of its upper end the member 4 is formed with a notch or socket 14, as shown in Figure 5. This notch or socket is for the purpose of receiving a tongue 15 located at the top of the fixed member 3, when the members are brought together, this tongue and socket serving to properly center the members relative to each other. In order to press the member 4 against the member 3 to clamp the work in position and to form it as hereinafter described, I provide a swinging bail 16 pivoted at 17 to the top of the member 3 and adapted to embrace the upper end of the member 4, as shown in Figure 1. Inside of the bail 16 is mounted a sliding block 18 in which is swiveled the end of a screw 19 working through the head of the bail, and provided with a crank handle 20 by means of which it may be turned. When raised to its idle position the bail 16 rests against a bracket 21 secured by bolts 22, as shown in Figures 3 and 5, but when swung down into operative position the bail embraces the top of the member 4 and the block 18 bears against the outer face 4b thereof, as shown in Figure 6. It is obvious that by turning the crank 20 the block 18 will be forced against the member 4 and this member is thereby pressed tightly against the member 3, these members being properly alined by reason of the fact that the tongue 15 is received within the notch 14.

Mounted within the channel portion at the outside of the member 4 is a heavy copper conductor or bus bar 23, to which is attached one terminal 24, leading to a transformer or other suitable source of current. Set into the bar 23 and extending inwardly through holes in the member 4 are a plurality of electrodes 25. Each of these electrodes is surrounded by a sleeve or bushing 26 of insulating material, such as fiber, at the point where it passes through the body of the member 4, thus effectively insulating the electrodes from the frame of the machine.

Opposite the electrodes 25 and arranged to register therewith, the member 3 is provided with a series of holes 27, each of these holes being lined with an insulating bushing 28, as clearly shown in Figure 2.

It will be understood that the ends of the electrodes 26 which are carried by the member 4 are so arranged as to snugly engage one side of the work to be welded, the work in the present instance being indicated in Figure 2 as comprising two sheets x and y arranged with their edges overlapped. In order to conduct current to the other side of the work and thus form a weld at each of the electrodes 25, I provide a welding tool consisting of an electrode 29 carried by a lever 30 provided with a handle 31. This lever is L-shaped, as shown, and is adapted to engage with a second conductor bar 32 supported parallel with, but spaced from the member 3, and connected to the other terminal of the source of current. This is a heavy bar preferably formed of copper or the like.

In practice, after the sheets to be welded have been clamped between the members 3 and 4 as described, the electrode 29 carried by the welding tool 30, is inserted in the holes 27 one after another, and firmly pressed against the sheets to be welded by swinging the lever against and about the bar 32 as a fulcrum. Thus this bar serves the double purpose of a mechanical support for the lever and of means for supplying electric current to the electrode 29.

In this particular instance it will be observed that the meeting edges of the two sheets x and y, as shown in Fig. 2, formed with a slight groove or bead at the point where the welding takes place. In Figure 7 there is clearly shown the manner in which the overlapping edges of the sheets x and y are nested together. Referring to this figure, it will be seen that a die block 33 is set into the working face of the member 4 at a point in line with and between the electrodes 25, and that a die member 34 having a complementary face is secured to the working face of the fixed member 3, being preferably held by pins 35 having a driving fit therein. Thus the sheets x and y when placed between the members 3 and 4 are so positioned that their edges overlap at a point between the dies 33 and 34. Upon turning the crank 20 therefore the members 3 and 4 carrying these dies are forced together, thus causing the dies to securely hold the edges of the sheets together in nested relation as shown.

In order to prevent any possibility of the bail 16 becoming disengaged from the top of the member 4, I may provide a swinging button 16a pivoted at 16b (see Figure 5), and adapted to be swung around into the position shown in dotted lines, in which position it will overlie the top edge of the bail and so effectually preclude any unintentional release of the bail 16.

While in accordance with the provisions of the patent statutes, I have disclosed and explained the preferred form of my invention, it will be apparent to those skilled in the art that changes may be made in the mode of operation and form of apparatus disclosed without departing from the spirit of my invention, and that certain features of the invention may sometimes be used without a corresponding use of other features. I wish it to be understood, therefore, that such changes are to be included within the scope of the appended claims.

What I claim is:

1. Spot welding apparatus comprising a fixed and a movable member between which the sheets to be welded are clamped, a series of electrodes carried by one of said members and having their ends positioned to engage one side of the work, the other member being provided with a series of holes arranged one opposite each of said electrodes, and a separate electrode adapted to be inserted in any one of said holes and brought into engagement with the other side of the work.

2. Spot welding apparatus comprising a fixed and a movable member between which the sheets to be welded are clamped, a series of electrodes carried by but insulated from one of said members, and having their ends positioned to engage one side of the work, the other member being provided with a series of holes arranged to register with said electrodes, an insulating bushing lining each hole, and a separate electrode adapted to be inserted in any one of said holes and pressed against the other side of the work.

3. Spot welding apparatus comprising a fixed and a movable member between which the sheets to be welded are clamped, a series of electrodes carried by one of said members and having their ends positioned to engage one side of the work, said electrodes being connected to one pole of a source of current, the other member being provided with a series of holes arranged to register with said electrodes, a conducting bar extending parallel with but spaced from the member having the holes and connected to the other pole of the source of current, and a welding tool comprising a lever adapted to rest against said bar as a fulcrum and having an electrode adapted to be inserted in any one of said holes and pressed against the other side of the work by means of said lever.

4. Spot welding apparatus comprising means for clamping the work, said means being formed with holes through which the work is accessible, a conducting bar connected to a source of current and extending parallel with but spaced from said clamping means, and a welding tool comprising an electrode adapted to be inserted in any one of said holes, and a manually operated lever adapted to rest against said bar as a fulcrum to press the electrode into contact with the work.

5. Welding apparatus comprising a fixed member provided with a working face having a contour conforming with the shape of the work, a movable member pivoted at one end to said fixed member and having a working face complementary to that of the latter, means tending constantly to urge said members together so as to grip the work between the above mentioned faces thereof, and means for passing a localized electric current through various portions of the work to spot weld the same while held between said members.

6. Welding apparatus comprising a fixed member provided with a substantially vertical working face having a contour conforming with the shape of the work, a movable member pivoted at its lower end to the lower portion of said fixed member and having a working face complementary to that of the latter, whereby the work can be inserted edgewise from the top downwardly between the faces of said members, means tending constantly to urge said members together so as to grip the work between said faces, and means for passing a localized electric current through various portions of the work to spot weld the same while held between said members.

7. Welding apparatus comprising a fixed member provided with a working face having a contour conforming with the shape of the work, a movable member pivoted at one end to said fixed member and having a working face complementary to that of the latter, a screw clamp at the free end of said movable member for pressing said members together to grip the work between the above mentioned faces thereof, and means for passing a localized electric current through various portions of the work to spot weld the same while held between said members.

8. Spot welding apparatus including a press to receive the work, such press comprising a fixed member and a movable member pivoted thereto, means including a series of electrodes carried by one of said members for producing spot welds in the work while held between said members, and means carried at the meeting faces of said members and located between and in line with said electrodes for securely retaining the work in nested relation.

9. A combined die press and spot welding device comprising a fixed member, a movable member pivoted thereto, said members having complementary working faces adapted to receive between them the sheets to be operated upon, a pair of dies carried by the working faces of said members, screw means for forcing said members together to cause said dies to hold the work sheets in the desired position, and means for electrically spot welding the formed sheets while held between said holding dies.

10. Welding apparatus comprising a pair of relatively movable members having complementally formed work engaging faces, said members being hinged at the lower ends thereof whereby the work to be welded can be inserted downwardly between said faces of the members, means for maintaining said members in clamping engagement with the work, and an adapter member arranged to be disposed in any one of a plurality of positions to establish a welding circuit for passing a localized electric current through various portions of the work.

11. Welding apparatus comprising a pair of pivotally connected members having complementally formed work engaging faces, means for maintaining said members in clamping engagement with the work, a plurality of spaced electrodes associated with one of said members, and arranged to engage one side of the work, a conducting bar associated with the other of said members, said electrodes and said bar being connected to opposite sides of the welding circuit, and an adapter member arranged to be fulcrumed upon said bar for engagement with said work opposite any one of said electrodes.

In testimony whereof he hereunto affixes his signature.

JOSEPH W. MEADOWCROFT.